United States Patent Office 2,922,886
Patented Jan. 26, 1960

2,922,886

METHOD AND APPARATUS FOR TESTING THE PRESENCE OF SPECIFIC ATOMIC ELEMENTS IN A SUBSTANCE

John Laban Putman, Abingdon, England, assignor, by mesne assignments, to the United States of America as represented by the United States Atomic Energy Commission Application November 22, 1954, Serial No. 470,398

Claims priority, application Great Britain November 21, 1953

2 Claims. (Cl. 250—71)

This invention relates to a method and apparatus for testing the presence of specific atomic elements in a substance.

The invention has particular application for the assay of comparatively inaccessible substances such as strata traversed by bore-holes in the ground and it is an object of the invention to provide a method and apparatus of high sensitivity, sufficient for example, to determine the nature of the substance surrounding a two inch thick steel bore-hole liner by inspection from within the bore-hole. For instance there is often known to be liquid surrounding the steel liner of a bore-hole at some particular depth and the problem is to test whether the liquid is oil or water.

Existing methods of bore-hole and well logging fail when applied to problems such as the last quoted. The existing methods are as follows:

(a) Gamma-ray logging. This consists in measuring the natural activity of strata by means of a detector lowered down a bore-hole.

(b) Neutron logging. This relies on the measurement of neutrons scattered back by the walls of a bore-hole and is an index of hydrogen concentration in the strata. Both a neutral source and a neutron detector are lowered down the bore-hole. The method is not easily applicable to the oil-water problem described above, as both oil and water contain large quantities of hydrogen.

(c) Gamma-ray back-scattering. The back-scattering of gamma-rays by a surface is an index of its mean atomic number. This method is limited in depth of inspection to the equivalent of about 1 inch of steel, because of absorption of the low energy back-scattered gamma-rays. Further, it is not very sensitive to small changes in atomic number.

According to the present invention a method of testing the presence of specific atomic elements in a substance comprises the steps of irradiating the substance with neutrons, detecting the occurrence and energy of the gamma rays which are emitted promptly by the nuclei of the substance being tested and by the nuclei of any intervening substance when the nuclei absorb neutrons and analysing the amplitudes of the detector output pulses into groups to determine the particular $n, \gamma$ reaction and thus the particular elementary substance corresponding to each group.

Apparatus in accordance with the invention for testing the presence of specific atomic elements in a substance may comprise a source of neutrons, a scintillation counter capable of delivering pulses of an amplitude proportional to gamma-ray energy, such as one comprising a NaI+Tl crystal as a phosphor, and a pulse amplitude analyser (kicksorter) adapted to identify those output pulses from the scintillation counter corresponding to the gamma radiations from a given $n, \gamma$ reaction or reactions.

The prompt gamma rays from an $n, \gamma$ reaction are in general of much higher energy than gamma rays from radioactive materials and thus are capable of penetrating and being detected through a considerable thickness of steel. Also, if the invention is used in circumstances not involving an intervening substance which absorbs low energy gamma rays, such rays are readily distinguished from the prompt gamma rays. Thus in order to detect the presence or otherwise of one particular element a single channel kicksorter may constitute the pulse amplitude analyser or kicksorter employed in the apparatus of the invention.

Embodiment of the invention will now be described by way of example with reference to the accompanying diagrammatic drawing in which.

Figure 1:
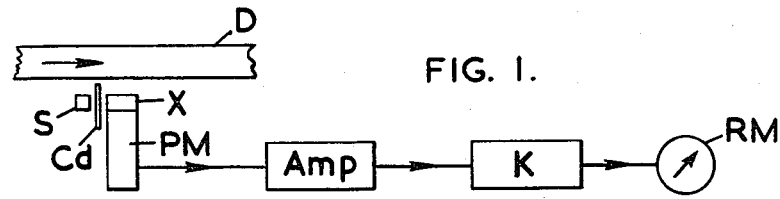
Fig. 1 shows a simple form of the invention as applied to process control.

In Fig. 1 a neutron source S, such as a polonium-beryllium source, is mounted adjacent a duct D carrying a material in which it is required to detect the presence of a specific atomic substance. For example, it may be required to detect the presence of chlorine as an impurity in a hydrocarbon such as mineral oil. In an alternative arrangement the source S may be inside the duct. Adjacent the source S but screened therefrom by a cadmium shield Cd is a thallium activated sodium iodide crystal X associated with a photomultiplier PM to constitute a gamma ray scintillation detector. The output of the photomultiplier is fed through an amplifier AMP to a single channel pulse analyser or "kicksorter" K, the output of which is indicated by a pulse rate meter RM.

An example of a pulse amplitude analyser suitable for the purposes of the invention is described in the specification of copending application Ser. No. 433,167, May 28, 1954.

In operation, the material passing through the duct D is neutron irradiated from the source S with the production of prompt gamma-rays of various well defined energies dependent on the identity of the nuclei which absorb the neutrons. The pulse amplitudes of the output of the photomultiplier are proportional to the energies and thus by arranging for the kicksorter K only to pass pulses of an amplitude corresponding to the energy of prompt gamma rays characteristic of the element it is desired to detect, the detector can be made selective for this element.

It will be appreciated that the shield Cd, which is provided to prevent direct irradiation of the crystal, and the duct D are sources of prompt gammas and that in this simple example it is necessary to be able to distinguish the prompt gammas which they emit from those emitted by the substance being detected on an energy basis. Thus for example, using a cadmium shield, it would not be possible to detect cadmium as an impurity and some other neutron absorber, such as boron, would then be used as a shield.

The energy spectra of the prompt gamma rays from the light elements up to atomic number 20 are published in "Reviews of Modern Physics," vol. 24, p. 321, 1952, and vol. 26, p. 95, 1954.

The energy spectra of other elements can be readily measured by established methods. It will be found that there is a limited number of elements which can be detected by means of the above described simple form of the invention. There are usually, however, secondary peaks in the energy spectrum and in the embodiment of the invention illustrated in Fig. 2 a plurality of kicksorters K1, K2 and K3 are arranged to pass signals of amplitudes corresponding to different energy levels.

Figure 2:
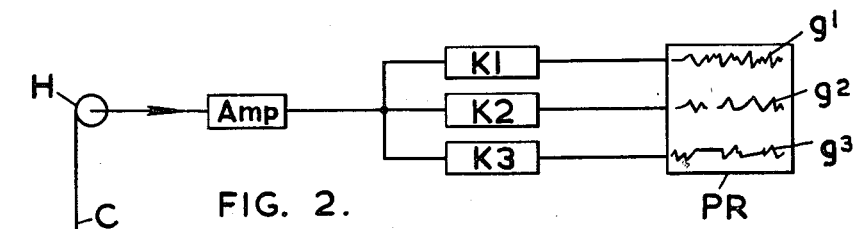
Fig. 2 shows another form of the invention as applied to bore-hole logging.

In Fig. 2 the invention is shown applied to the problem of bore hole logging for the purpose of detecting the presence of particular strata or the presence of water or oil. The apparatus comprises a probe P suspended from a cable C in a bore hole B. The cable passes over a winding head H to an amplifier AMP from whence the signal is fed to the inputs of the said three kicksorters K1, K2 and K3.

Figure 3:
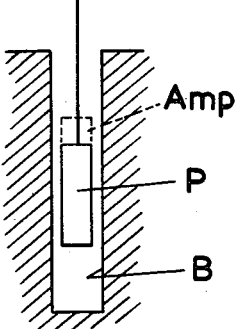
Fig. 3 is a view on a larger scale of the probe unit of Fig. 2.
Figure 3:
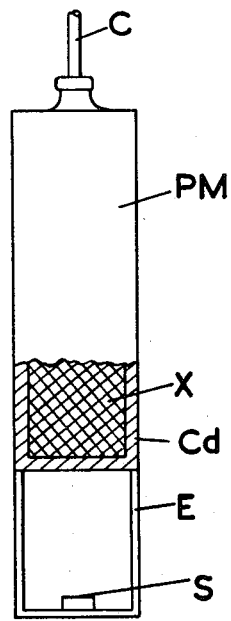

The probe P is shown in Fig. 3 as comprising a photomultiplier PM, a crystal X, surrounded by a cadmium sheath Cd, and a polonium-beryllium source S mounted on an extension piece E. The output of each kicksorter is fed to a respective channel of a multi-pen recorder PR so that three separate graphs $g1$, $g2$ and $g3$ representing the count rates at three selected energy levels are obtained and any position on the graph can be related to a particular level in the bore hole.

Kicksorter K1 may be arranged to pass signals of an amplitude corresponding to the main peak in the prompt gamma spectrum of an element in a particular stratum so that each peak on graph $g1$ is indicative of the presence of that strata or of a strata containing an element having a similar or not readily distinguishable peak. Kicksorters K2 and K3 are arranged to pass signals corresponding to the next two most characteristic peaks in the spectrum of the element in question. Thus, by analysis of the three graphs $g1$, $g2$ and $g3$ and, if necessary, further graphs related to additional kicksorters, the presence of any particular element or combination of elements and their depths in the bore bole can be determined, any ambiguity in the primary graph being resolved by the secondary graphs.

It will be appreciated that a multi-channel kicksorter may be employed in place of several independent kicksorters or that one adjustable single channel kicksorter could be arranged on a time sharing basis to do the work of several. The amplifier AMP may, alternatively to being positioned above ground, be incorporated in whole or in part in the probe as indicated in broken lines at AMP in Fig. 2.

I claim:
1. A method of testing for the presence of predetermined atomic elements in a substance comprising the steps of irradiating the substance with neutrons to produce nucleonic neutron gamma reactions, detecting prompt gamma rays emitted from the nuclei of the material tested, establishing a plurality of analyzing energy levels in accordance with energy peaks in the gamma energy spectrum of the element tested for, and comparing said detected gamma energy with said established energy levels whereby correspondence therebetween identifies the presence of the element.

2. Apparatus for detecting the presence of specific atomic elements comprising a portable neutron source adapted for disposition adjacent materials to be tested for the presence of said atomic elements and emitting neutrons for bombarding the materials, an inorganic scintillation crystal disposed adjacent said neutron source in shielded relation thereto for receiving gamma rays from said bombarded material including those produced by characteristic neutron-gamma reactions and producing output signals having amplitudes proportional to the energy of incident gamma rays, and recording means accepting signals from said scintillation crystal and having a plurality of variable energy-level channels adjustable to correspondence with the peak energy levels of gamma radiation from specific atomic particles whereby simultaneous channel actuation results from neutron gamma radiation of a predetermined atomic element for identification thereof.

References Cited in the file of this patent

UNITED STATES PATENTS

| 2,648,012 | Scherbatskoy | Aug. 4, 1953 |
| 2,686,266 | Pringle et al. | Aug. 10, 1954 |
| 2,721,944 | Ruble | Oct. 25, 1955 |
| 2,752,504 | McKay | June 26, 1956 |
| 2,778,947 | Sherbatskoy | Jan. 22, 1957 |
| 2,830,185 | Scherbatskoy | Apr. 8, 1958 |

Disclaimer 2,922,886.—*John Laban Putman*, Abingdon, England. METHOD AND APPARATUS FOR TESTING THE PRESENCE OF SPECIFIC ATOMIC ELEMENTS IN A SUBSTANCE. Patent dated Jan. 26, 1960. Disclaimer filed Dec. 3, 1962, by the assignee, the *United States of America as represented by the United States Atomic Energy Commission*.

Hereby enters this disclaimer to claims 1 and 2 of said patent.

[*Official Gazette January 8, 1963.*]